US005291732A

United States Patent [19]

Halila

[11] Patent Number: 5,291,732

[45] Date of Patent: Mar. 8, 1994

[54] COMBUSTOR LINER SUPPORT ASSEMBLY

[75] Inventor: Ely E. Halila, Cincinnati, Ohio

[73] Assignee: General Electric Company, Cincinnati, Ohio

[21] Appl. No.: 14,886

[22] Filed: Feb. 8, 1993

[51] Int. Cl.[5] .................................... F02C 7/20

[52] U.S. Cl. .................................... 60/39.31; 60/39.32; 60/752; 60/753

[58] Field of Search .................... 60/39.31, 39.32, 752, 60/753

[56] References Cited

U.S. PATENT DOCUMENTS

| | | | |
|---|---|---|---|
| 2,801,520 | 8/1957 | Highberg | 60/39.32 |
| 3,842,595 | 10/1974 | Smith et al. | 60/39.32 |
| 3,965,066 | 6/1976 | Sterman et al. | 60/39.32 |
| 4,173,118 | 11/1979 | Kawaguchi | 60/39.65 |
| 4,194,358 | 3/1980 | Stenger | 60/39.06 |
| 4,374,466 | 2/1983 | Sotheran | 60/39.36 |
| 4,480,436 | 11/1984 | Maclin | 60/39.32 |
| 4,555,901 | 12/1985 | Wakeman et al. | 60/39.32 |
| 4,567,730 | 2/1986 | Scott | 60/757 |
| 4,901,522 | 2/1990 | Commaret et al. | 60/39.32 |
| 4,912,922 | 4/1990 | Maclin | 60/39.32 |

OTHER PUBLICATIONS

Jones, "Advanced Technology for Reducing Aircraft Engine Pollution," Nov. 1974, Transactions of the ASME, Serie B: Journal of Engineering for Industry, pp. 1354–1360.

*Primary Examiner*—Richard A. Bertsch
*Assistant Examiner*—Howard R. Richman
*Attorney, Agent, or Firm*—Jerome C. Squillaro; Charles L. Moore, Jr.

[57] ABSTRACT

A support assembly for a gas turbine engine combustor includes an annular frame having a plurality of circumferentially spaced apart tenons, and an annular combustor liner disposed coaxially with the frame and including a plurality of circumferentially spaced apart tenons circumferentially adjoining respective ones of the frame tenons for radially and tangentially supporting the liner to the frame while allowing unrestrained differential thermal radial movement therebetween.

9 Claims, 4 Drawing Sheets

COMBUSTOR LINER SUPPORT ASSEMBLY

The invention herein described was made in the performance of work under a NASA Contract and is subject to the provisions of Section 305 of the National Aeronautics and Space Act of 1958, Public Law 85-568 (72 Stat. 435; 42 USC 2457).

The present invention relates generally to gas turbine engines, and, more specifically, to a low $NO_x$ combustor therein.

CROSS REFERENCE TO RELATED APPLICATION

The present invention is related to concurrently filed patent application Ser. No. 08/014,949, entitled "Segmented Combustor;" Ser. No. 08/014,887, entitled "Low $NO_x$ Combustor,"; and Ser. No. 08/014,923, entitled "Liner Mounting Assembly,"; all by the same inventor and assignee.

BACKGROUND OF THE INVENTION

In a gas turbine engine, a fuel and air mixture is ignited for generating combustion gases from which energy is extracted for producing power, such as thrust for powering an aircraft in flight. In one aircraft designated High Speed Civil Transport (HSCT), the engine is being designed for powering the aircraft at high Mach speeds and high altitude conditions. And, reduction of exhaust emissions from the combustion gases is a primary objective for this engine.

More specifically, conventionally known oxides of nitrogen, i.e. $NO_x$, are environmentally undesirable and the reduction thereof from aircraft gas turbine engines is desired. It is known that $NO_x$ emissions increase when cooling air is injected into the combustion gases during operation. However, it is difficult to reduce the amount of cooling air used in a combustor since the combustor itself is typically made of metals requiring suitable cooling in order to withstand the high temperatures of the combustion gases.

In a typical gas turbine engine, a compressor provides compressed air which is mixed with fuel in the combustor and ignited for generating combustion gases which are discharged into a conventional turbine which extracts energy therefrom for powering, among other things, the compressor. In order to cool the combustor, a portion of the air compressed in the compressor is bled therefrom and suitably channeled to the various parts of the combustor for providing various types of cooling thereof including conventional film cooling and impingement cooling. However, any air bled from the compressor which is not used in the combustion process itself decreases the overall efficiency of the engine, but, nevertheless, is typically required in order to suitably cool the combustor for obtaining a useful life thereof.

One conventionally known, advanced combustor design utilizes non-metallic combustor lines which have a higher heat temperature capability than the conventional metals typically utilized in a combustor. Non-metallic combustor liners may be conventionally made from conventional Ceramic Matrix Composite (CMC) materials such as that designated Nicalon/Silicon Carbide (SiC) available from Dupont SEP; and conventional carbon/carbon (C/C) which are carbon fibers in a carbon matrix being developed for use in high temperature gas turbine environments. However, these non-metallic materials typically have thermal coefficients of expansion which are substantially less than the thermal coefficients of expansion of conventional superalloy metals typically used in a combustor from which such non-metallic liners must be supported.

Accordingly, during the thermal cycle operation inherent in a gas turbine engine, the various components of the combustor expand and contract in response to heating by the combustion gases, which expansion and contraction must be suitably accommodated without interference in order to avoid unacceptable thermally induced radial interference loads between the combustor components which might damage the components or result in an unacceptably short useful life thereof. Since the non-metallic materials are also typically relatively brittle compared to conventional combustor metallic materials, they have little or no ability to deform without breakage. Accordingly, special arrangements must be developed for suitably mounting non-metallic materials in a conventional combustor in order to prevent damage thereto from radial interference during thermal cycles and for obtaining a useful life thereof.

Since non-metallic materials being considered for use in a combustor have higher temperature capability than conventional combustor metals, they may be substantially imperforate without using typical film cooling holes therethrough, which therefore reduces the need for bleeding compressor cooling air, with the eliminated film cooling air then reducing $NO_x$ emissions since such air is no longer injected into the combustion gases downstream from the introduction of the original fuel-/air mixture. However, it is nevertheless desirable to cool the back sides of the non-metallic materials in the combustor, with a need, therefore, for discharging the spent cooling air into the flowpath without increasing $NO_x$ emissions from the combustion gases.

Furthermore, the various components of a conventional combustor must also typically withstand differential axial pressures thereon, and vibratory response without adversely affecting the useful life of the components. This provides additional problems in mounting non-metallic materials in the combustor since such mounting must also accommodate pressure loads and vibration of the components in addition to accommodating thermal expansion and contraction thereof.

SUMMARY OF THE INVENTION

A support assembly for a gas turbine engine combustor includes an annular frame having a plurality of circumferentially spaced apart tenons, and an annular combustor liner disposed coaxially with the frame and including a plurality of circumferentially spaced apart tenons circumferentially adjoining respective ones of the frame tenons for radially and tangentially supporting the liner to the frame while allowing unrestrained differential thermal radial movement therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
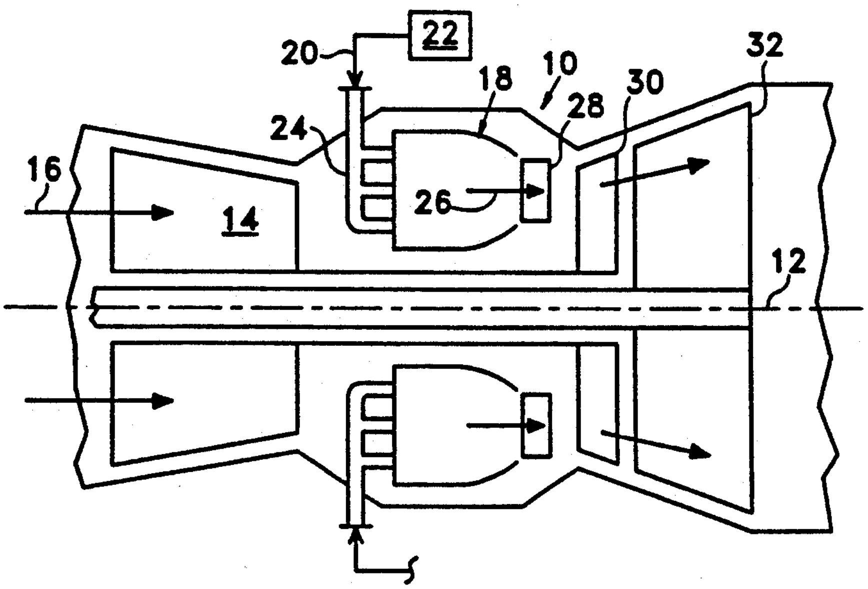
FIG. 1 is a schematic, longitudinal sectional view of a portion of a gas turbine engine including an annular combustor in accordance with one embodiment of the present invention.

Illustrated schematically in FIG. 1 is a portion of an exemplary gas turbine engine 10 having a longitudinal or axial centerline axis 12. The engine 10 is configured for powering a High Speed Civil Transport (HSCT) at high Mach numbers and at high altitude with reduced oxides of nitrogen ($NO_x$) in accordance with one objective of the present invention. The engine 10 includes, inter alia, a conventional compressor 14 which receives air 16 which is compressed therein and conventionally channeled to a combustor 18 effective for reducing $NO_x$ emissions. The combustor 18 is an annular structure disposed coaxially about the centerline axis 12 and is conventionally provided with fuel 20 from a conventional means 22 for supplying fuel which channels the fuel 20 to a plurality of circumferentially spaced apart fuel injectors 24 which inject the fuel 20 into the combustor 18 wherein it is mixed with the compressed air 16 and conventionally ignited for generating combustion gases 26 which are discharged axially downstream from the combustor 18 into a conventional high pressure turbine nozzle 28, and, in turn, into a conventional high pressure turbine (HPT) 30. The HPT 30 is conventionally joined to the compressor 14 through a conventional shaft, with the HPT 30 extracting energy from the combustion gases 26 for powering the compressor 14. A conventional power or low pressure turbine (LPT) 32 is disposed axially downstream from the HPT 30 for receiving therefrom the combustion gases 26 from which additional energy is extracted for providing output power from the engine 10 in a conventionally known manner.

Figure 2:
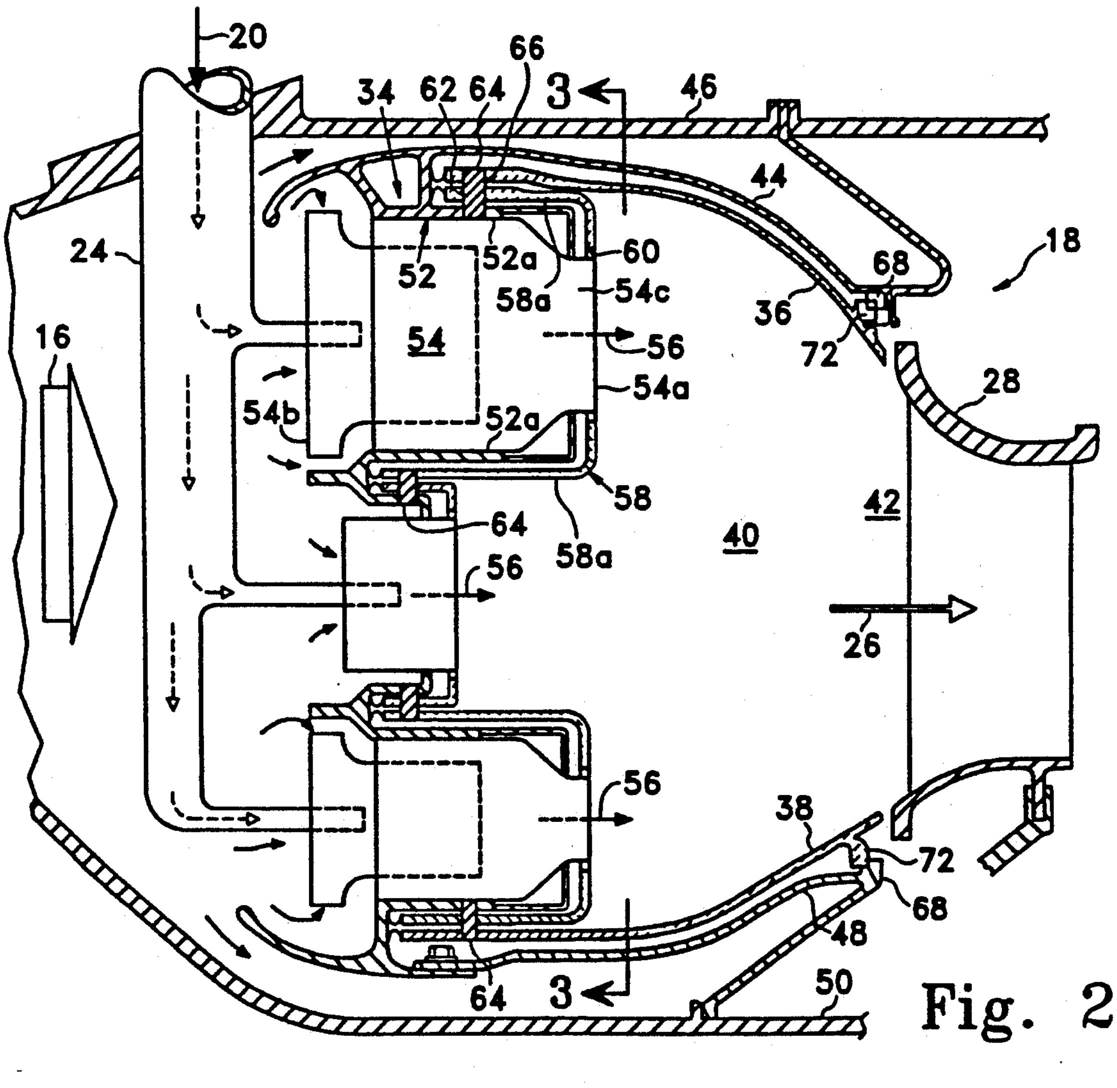
FIG. 2 is an enlarged schematic view of the top portion of the combustor shown in FIG. 1 illustrating an exemplary triple dome assembly and annular liners joined to annular frames in accordance with one embodiment of the present invention.

Illustrated in more detail in FIG. 2 is the upper portion of the combustor 18 of FIG. 1 which includes at its upstream end an annular structural dome assembly 34 to which are joined an annular radially outer liner 36 and an annular radially inner liner 38. The inner liner 38 is spaced radially inwardly from the outer liner 36 to define therebetween an annular combustion zone 40, with downstream ends of the outer and inner liners 36, 38 defining therebetween a combustor outlet 42 for discharging the combustion gases 26 therefrom and into the nozzle 28. In the exemplary embodiment illustrated in FIG. 2, the dome assembly 34 includes a radially outer, annular supporting frame 44 conventionally joined to an annular outer casing 46, and a radially inner, annular supporting frame 48 conventionally fixedly joined to an annular, radially inner casing 50. The dome assembly 34 may be otherwise conventionally supported to the outer and inner casings 46, 50 as desired.

In the exemplary embodiment illustrated in FIG. 2, the dome assembly 34 and the outer and inner frames 44, 48 are made from conventional metallic combustor materials typically referred to as superalloys. Such superalloys have relatively high temperature capability to withstand the hot combustion gases 26 and the various pressure loads, including axial loads, which are carried thereby due to the high pressure air 16 from the compressor 14 acting on the dome assembly 34, and on the liners 36, 38.

In a conventional combustor, conventional metallic combustion liners would extend downstream from the dome assembly 34, with each liner including a plurality of conventional film cooling apertures therethrough which are supplied with a portion of the compressed air 16 for cooling the liners, with the spent film cooling air then being discharged into the combustion zone 40 wherein it mixes with the combustion gases 26 prior to discharge from the combustor outlet 42. An additional portion of the cooling air 16 is also conventionally used for cooling the dome assembly 34 itself, with the spent cooling air also being discharged into the combustion gases 26 prior to discharge from the outlet 42. Bleeding a portion of the compressed air 16 from the compressor 14 (see FIG. 1) for use in cooling the various components of a combustor necessarily reduces the available air which is mixed with the fuel 20 and undergoes combustion in the combustion zone 40 which, in turn, decreases the overall efficiency of the engine 10. Furthermore, any spent cooling air 16 which is reintroduced into the combustion zone 40 and mixes with the combustion gases 26 therein prior to discharge from the outlet 42 typically increases nitrogen oxide ($NO_x$) emissions from the combustor 18 as is conventionally known.

For the HSCT application described above, it is desirable to reduce the amount of the air 16 bled from the compressor 14 for cooling purposes, and to also reduce the amount of spent cooling air injected into the combustion gases 26 prior to discharge from the combustor outlet 42 for significantly reducing $NO_x$ emissions over a conventionally cooled combustor.

In accordance with one object of the present invention, the outer and inner liners 36, 38 are preferably non-metallic material effective for withstanding heat from the combustion gases 26 and are also preferably substantially imperforate and characterized by the absence of film cooling apertures therein for eliminating the injection of spent film cooling air into the combustion gases 26 prior to discharge from the outlet 42 for reducing $NO_x$ emissions and also allowing higher temperature combustion within the combustion zone 40. Conventional non-metallic combustor liner materials are known and include conventional Ceramic Matrix Composites (CMC) materials and carbon/carbon (C/C) as described above. These non-metallic materials have high temperature capability for use in a gas turbine engine combustor, but typically have low ductility and, therefore, require suitable support in the combustor 18 for accommodating pressure loads, vibratory response, and differential thermal expansion and contraction relative to the metallic dome assembly 34 for reducing stresses therein and for obtaining a useful effective life thereof.

Since conventional non-metallic combustor materials have a coefficient of thermal expansion which is substantially less than the coefficient of thermal expansion of metallic combustor materials such as those forming the dome assembly 34, the liners 36, 38 must be suitably joined to the dome assembly 34, for example, for allowing unrestricted or unrestrained thermal expansion and contraction movement relative to the dome assembly 34 to prevent or reduce thermally induced loads therefrom.

Furthermore, the metallic dome assembly 34 itself must also be suitably protected from the increased high temperature combustion gases 26 within the combustion zone 40 which are realized due to the non-metallic liners 36, 38.

Referring again to FIG. 2, the dome assembly 34 includes at least one or a first annular dome 52 having a pair of axially extending and radially spaced apart first flanges 52*a* between which are suitably fixedly joined to the first dome 52 a plurality of circumferentially spaced apart first carburetors 54 which are effective for discharging from respective first outlets 54*a* thereof a fuel/air mixture 56. In the preferred embodiment illustrated in FIG. 2, the dome assembly 34 is a triple dome assembly with the top and bottom domes providing main combustion and the center dome providing pilot combustion, but many include one or more domes as desired.

Figure 3:
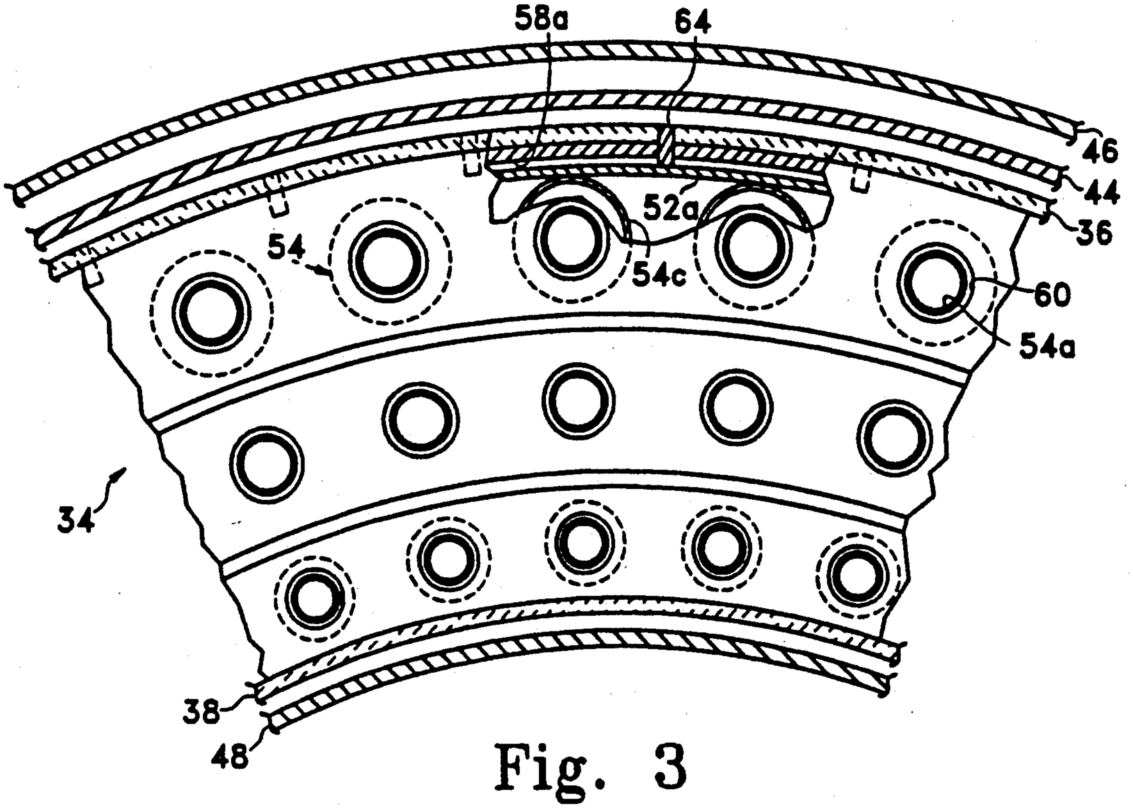
FIG. 3 is an upstream facing, partly sectional view of the combustor illustrated in FIG. 2 taken generally along line 3—3.

Each of the first carburetors 54 includes a conventional air swirler 54*b* which receives a portion of the fuel 20 from a first tip of the fuel injector 24 for mixing with a portion of the compressed air 16 and discharged through a tubular mixing can or mixer 54*c*, with the resulting fuel/air mixture 56 being discharged from the first outlet 54*a* into the combustion zone 40 wherein it is conventionally ignited for generating the combustion gases 26. Referring also to FIG. 3, several of the circumferentially spaced apart first carburetors 54 including their outlets 54*a* are illustrated in more particularity.

Figure 4:
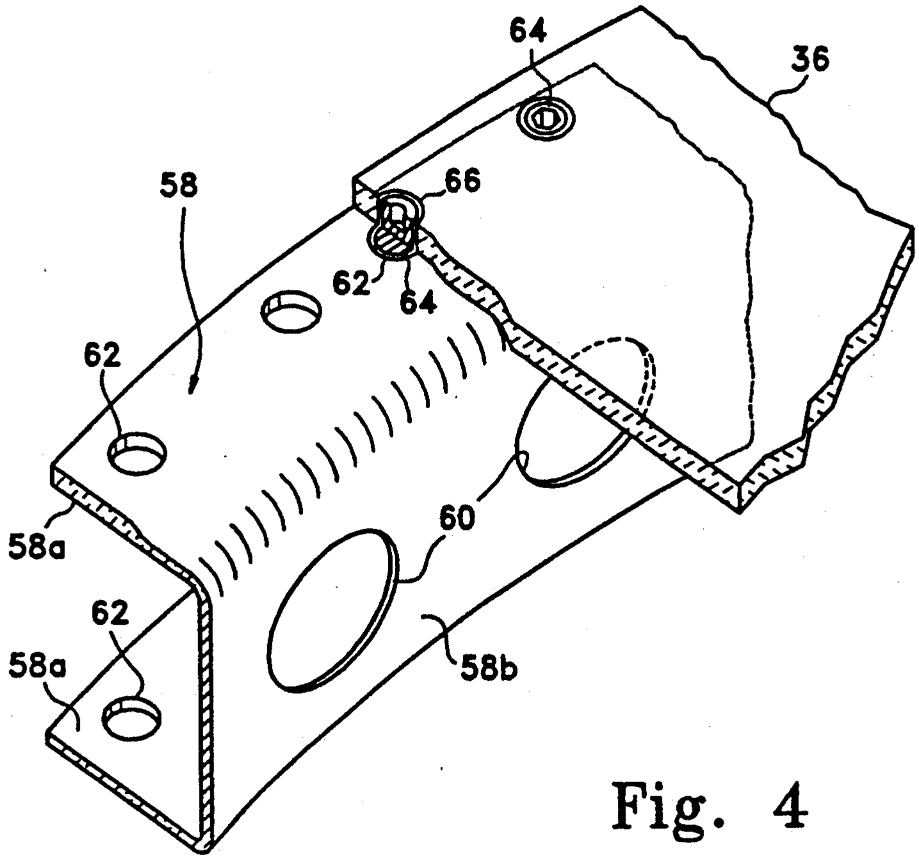
FIG. 4 is a perspective view of a portion of an exemplary one of the heat shields used in the combustor illustrated in FIG. 2.

In order to protect the metallic first dome 52 and the first carburetors 54 from the high temperature combustion gases 26, an annular first heat shield 58 mounted in accordance with the present invention is provided and includes a pair of radially spaced apart and axially extending first legs 58*a*, better shown in FIG. 4, which are integrally joined to a radially extending first base or face 58*b* in a generally U-shaped configuration, with the first face 58*b* facing in a downstream, aft direction toward the combustion zone 40. The first face 58*b* includes a plurality of circumferentially spaced apart first access ports 60 disposed concentrically with respective ones of the first outlets 54*a* for allowing the fuel/air mixture 56 to be discharged from the first carburetors 54 axially through the first heat shield 58. And, at least one, and preferably both, of the first legs 58*a* includes a plurality of circumferentially spaced apart and radially extending mounting holes 62, as best shown in FIG. 4, disposed adjacent to a respective mounting one, and in a preferred embodiment both, of the first flanges 52*a*.

As shown in FIG. 2, the top leg 58*a* is disposed radially above the top first flange 52*a* and predeterminedly spaced therefrom, and the bottom leg 58*a* is disposed radially below the bottom first flange 52*a* and suitably spaced therefrom. In order to mount the first heat shield 58 to the dome assembly 34, a plurality of circumferentially spaced apart mounting pins 64 are suitably fixedly joined to at least one of the first flanges 52*a* and extend radially through respective ones of the mounting holes 62 without interference or restraint therewith for allowing unrestrained differential thermal growth and contraction movement between the first heat shield 58 and the first dome 52 while supporting the first heat shield 58 against axial pressure loads thereon.

The outer diameter of the mounting pin 64 is suitably less than the inner diameter of the mounting hole 62, subject to conventional manufacturing tolerances, for allowing free radial movement of the mounting pin 64 through the mounting hole 62 subject solely to any friction therebetween where one or more portions of the mounting pins 64 slide against the mounting holes 62. As best shown in FIG. 2, the first dome 52 is, therefore, allowed to expand radially outwardly at a greater growth than the radially outwardly expansion of the annular first heat shield 58, with the mounting pins 64 sliding radially outwardly through the respective mounting holes 62. In this way, differential thermal movement between the first heat shield 58 and the first dome 52 is accommodated for preventing undesirable thermal stresses in the first heat shield 58 which could lead to its thermal distortion and damage thereof. However, the mounting pin 64 nevertheless supports the first heat shield 58 to the first dome 52 against pressure forces acting on the first heat shield 58 as well as vibratory movement thereof. For example, axial pressure forces across the first face 58*b* are reacted at least in part through the mounting pins 64 and transferred into the first dome 52 and in turn into the outer and inner frames 44, 48.

Since the first heat shield 58 is also preferably a non-metallic material formed, for example, from a ceramic matrix composite, it is preferably imperforate between the mounting holes 62 and the ports 60 as best shown in FIG. 4. Accordingly, no film cooling holes are provided in the first heat shield 58 and, therefore, no spent film cooling air is injected into the combustion gases 26 which would lead to an increase in $NO_x$ emissions. However, a portion of the compressed air 16 may be suitably channeled against the back sides of the outer and inner liners 36, 38 as well as against the back side of the first heat shield 58 for providing cooling thereof, and then suitably reintroduced into the flowpath without increasing $NO_x$ emissions.

More specifically, and referring to FIG. 2, the combustor 18 preferably further includes an annular metallic impingement baffle suitably disposed between the first dome 52 and the first heat shield 58 and predeterminedly spaced therefrom. The baffle includes an aperture through which extends the mixing can 54*c*, and a plurality of conventional impingement holes therethrough for injecting a portion of the cooling air 16 in impingement against the first heat shield 58 for impingement cooling the back side thereof. However, the spent impingement air used for cooling the first heat shield 58 is preferably not injected directly into the combustion gases 26 within the combustion zone 40 to prevent an increase in $NO_x$ emissions. Instead, the ports 60 are preferably larger in diameter than the first outlets 54*a* for defining therebetween respective annular gaps for discharging therethrough the spent impingement air firstly used for impingement cooling of the first heat shield 58 concentrically around each outlet 54*a* for mixing with the fuel/air mixtures 56 being discharged from the first outlets 54*a* so that the spent impingement air is also used in the combustion process from the beginning and is not, therefore, reintroduced into the hot combustion gases 26 which would dilute the gases 26 and increase $NO_x$ emissions. The baffle is also generally U-shaped to match the configuration of the first heat shield 58 and provide a substantially uniform spacing therebetween for obtaining effective impingement cooling of the back side of the first heat shield 58.

Figure 7:
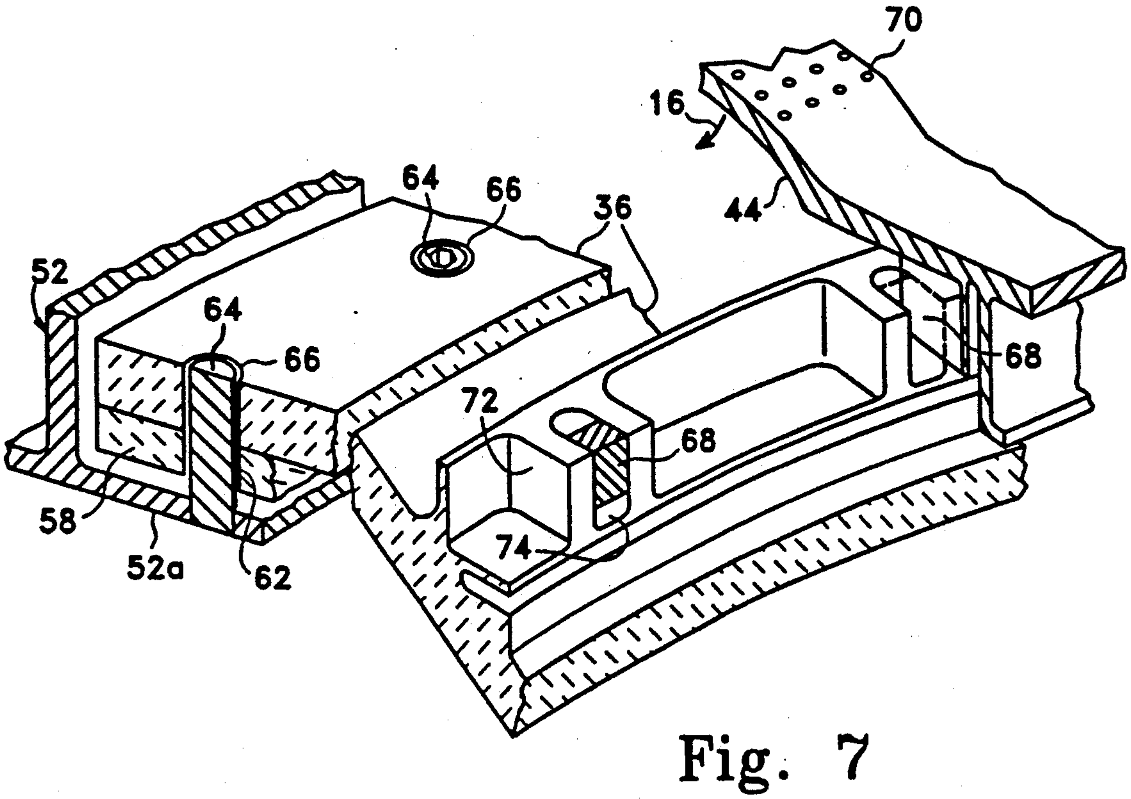
FIG. 7 is a perspective, partly sectional view of the outer liner illustrated in FIG. 2 showing the mounting thereof at its forward end to a dome assembly, and at its aft end to the frame illustrated in FIG. 5.

As shown in FIGS. 2, 3, and 7, at least one of the outer and inner liners 36, 38 includes a plurality of circumferentially spaced apart mounting holes 66 at upstream ends thereof, and the pins 64 preferably additionally extend radially through the mounting holes 66 for mounting both the first heat shield 58 and the outer liner 36 directly to the dome assembly 34 for allowing unrestrained differential thermal movement therebetween while supporting the first heat shield 58 and the outer liner 36 against axial pressure loads thereon. Just as the mounting pins 64 allow for differential thermal expansion and contraction therebetween the metallic dome assembly 34 and the annular first heat shield 58, they also allow for differential thermal expansion relative to the annular outer liner 36.

Referring again to FIG. 2, the outer and inner liners 36, 38 could be mounted solely at their forward ends by the mounting pins 64 to the dome assembly 34, with their aft ends being free in space. However, this would require that the liners 36, 38 have a suitably large thickness which would necessarily increase thermal temperature gradients radially across the liners, with higher surface temperatures facing the combustion zone 40 and corresponding higher thermal stresses therethrough. Furthermore, manufacturing tolerances in the diameter of the mounting pins 64, in their positions in the dome assembly 34, and in the positions of the mounting holes 66, effect the accurate assembly thereof which will lead to variations in load transfer from the liners 36, 38 and through the pins 64 and into the dome assembly 34. The variation in pin loading correspondingly varies the stresses around the mounting holes 66 and will also affect the natural frequencies of the liners 36, 38 which depend in part on the number of mounting pins 64 and their ability to restrain vibration of the liners. Mounting of the liners 36, 38 solely at their forward ends would also lower the natural frequencies of vibration making them closer to the excitation frequencies within the normal engine operating range. To provide adequate frequency margin, the liners 36, 38 could also be further thickened, but, however, this again leads to undesirable higher thermal gradients and stresses within the liners themselves.

Yet further, the outer liner 36 provides the outer boundary for the combustion zone 40 with higher pressure compressed air 16 being conventionally provided radially outside the outer liner 36 and lower pressure combustion gases 26 being provided within the combustion zone 40. The differential pressure acting across the outer liner 36 imposes buckling loads on the outer liner 36, which, therefore, must be suitably configured for resisting buckling thereof, which, for example, may be accomplished by increasing the thickness of the outer liner 36, which in turn, again undesirably increases thermal gradients and stresses therethrough.

In order to eliminate these limiting conditions without undesirably increasing the thickness of the liners 36, 38, the support assembly for the liners 36, 38 in accordance with the present invention provides aft mounting of the liners 36, 38 to their respective frames 44, 48 while allowing free radial and axial thermal expansion and contraction therebetween to prevent undesirable restraining loads which could damage the liners 36, 38. In the preferred embodiment, the liners 36, 38 are non-metallic, for example ceramic matrix composite material, which have a coefficient of thermal expansion substantially less than the coefficient of thermal expansion of the metallic supporting frames 44, 48. Accordingly, the liners 36, 38 must be suitably joined to the frames 44, 48 for allowing unrestrained differential thermal movement therebetween while suitably supporting the liners 36, 38 for restraining other movement thereof.

Figure 5:
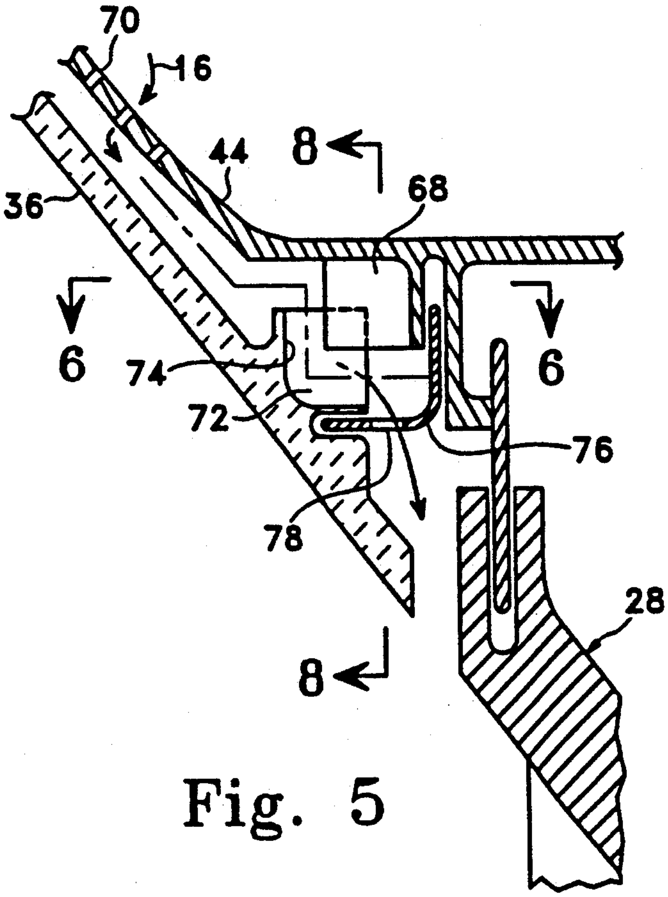
FIG. 5 is an enlarged, partly sectional view of a support assembly for the aft end of the outer liner illustrated in FIG. 2 in accordance with an exemplary embodiment of the present invention.

More specifically, FIGS. 5–8 illustrate the invention with respect to the aft end of the outer liner 36 although a similar configuration is also used for the aft end of the inner liner 38 as illustrated in FIG. 2. The support assembly includes the annular outer frame 44 having a plurality of circumferentially spaced apart, radially inwardly extending frame tenons 68, which in the preferred embodiment are uniformly spaced around the entire circumference of the outer frame 44 about the centerline axis 12. The outer liner 36 is disposed coaxially with the frame 44 and is spaced radially inwardly therefrom to provide a predetermined gap therebetween for conventional impingement or convection cooling of the outer liner 36. For example, a plurality of spaced apart impingement cooling holes 70 direct a portion of the air 16 from the compressor 14 in impingement against the outer surface of the outer liner 36 for impingement cooling thereof as illustrated in FIGS. 5 and 7.

Figure 6:
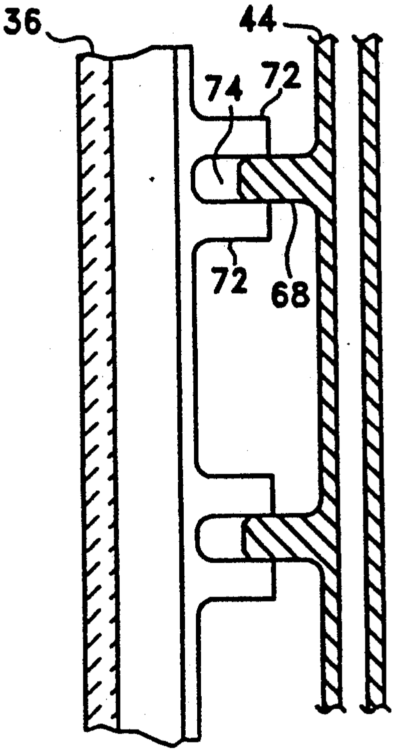
FIG. 6 is a partly sectional view through cooperating frame and liner tenons of the liner support illustrated in FIG. 5 and taken along line 6—6.
Figure 8:
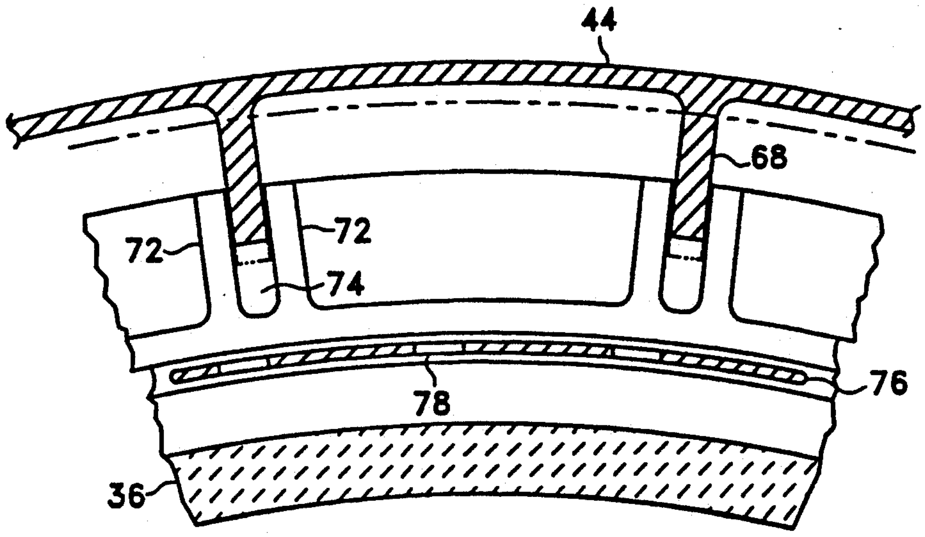
FIG. 8 is a partly sectional, forward looking view of the outer liner aft support assembly illustrated in FIG. 5 and taken along line 8—8.

The aft end of the outer liner 36 includes in accordance with the present invention a plurality of circumferentially spaced apart and radially outwardly extending liner tenons 72 circumferentially adjoining respective ones of the frame tenons 68 for collectively radially and tangentially supporting the outer liner 36 to the outer frame 44 while allowing unrestrained differential thermal radial movement therebetween. As shown in FIGS. 6–8, the frame and liner tenons 68, 72 are disposed in tongue-and-groove arrangements for preventing circumferential movement therebetween while allowing differential radial and axial movement therebetween and thereby providing additional support. The tongue-and-groove arrangement may be configured by using at least one set of the frame tenons 68 and the liner tenons 72 disposed in pairs, with each tenon pair being predeterminedly circumferentially spaced apart to define a radially extending slot 74 therebetween slidably receiving therein a complementary tenon from the other of the frame or liner tenons 68, 72 for restraining circumferential movement of the outer liner 36 at its aft end in both clockwise and counterclockwise directions around the centerline axis 12 while allowing radial, as well as axial, movement of the tenons in the slots 74.

As illustrated in FIG. 6, for example, the liner tenons 72 are disposed in pairs to define the slots 74 therebetween, with the frame tenons 68 being disposed as single tongue members for sliding movement within the respective slots 74. Of course, the frame tenons 68 could alternatively be disposed in pairs with a respective slot therebetween, and the liner tenons 72 being disposed as single tongue members cooperating with the frame tenons 68.

Referring to FIG. 7, the forward end of the outer liner 36 is preferably joined to the first dome 52 of the dome assembly 34 by the pins 64 extending through the liner mounting holes 66 for allowing differential thermal movement therebetween while suitably axially, radially, and tangentially supporting the outer liner 36 to the dome 52 as described above. And, the aft end of the outer liner 36 preferably includes the liner tenons 72 thereon joining the liner aft end to the outer frame 44 for providing an additional structural support for the outer liner 36. As illustrated in FIG. 7, the frame and liner tenons 68, 72 are preferably rectangular, flat plate members which extend both radially and axially, with the frame tenon 68 being slidably disposed within the liner slot 74 for allowing both radial and axial differential thermal expansion and contraction movement of the liner tenons 72 relative to the frame tenons 68.

FIG. 5 illustrates in solid line the position of the frame tenons 68 relative to the liner tenons 72 in the liner slots 74 during a hot operating condition of the combustor 18, with the cold operating condition being shown schematically by the phantom line of the outer frame 44 and frame tenons 68 disposed closer to the outer liner 36. During operation, as the combustion gases 26 heat the outer liner 36 and the outer frame 44, the outer frame 44 will expand radially as well as axially greater than the corresponding expansion of the outer liner 36 due to its higher coefficient of thermal expansion. The cooperating frame and liner tenons 68, 72 thereby allow the frame tenons 68 to move radially outwardly, as well as axially downstream, from the liner tenons 72 without restraint which, therefore, avoids thermal restraint loads on the aft end of the outer liner 36.

However, although the differential radial and axial movement between the frame and liner tenons 68, 72 is permitted by this preferred configuration, the tenons 68, 72 nevertheless provide radial and tangential support of the aft end of the outer liner 36. Since the tenons 68, 72 are spaced preferably uniformly around the circumference of the outer liner 36, they structurally join together the aft end of the outer liner 36 to the frame 44 and prevent radial and tangential movement of the outer liner 36 due to lateral contact of the liner tenons 72 with the frame tenons 68. In this way, buckling resistance of the outer liner 36 is increased, which, therefore, allows for a thinner outer liner 36 to be used. Furthermore, since buckling is a wave phenomena, the liner tenons 72 are preferably disposed in pairs to prevent wave-type movement of the outer liner 36 in either a clockwise or counterclockwise direction around the centerline axis 12 which ensures that buckling strength is increased in both directions.

Accordingly, the outer liner 36 is supported at both its forward and aft ends for preventing axial, radial, and tangential movement thereof while allowing unrestrained differential thermal expansion and contraction movement between the outer liner 36 and the supporting outer frame 44 and dome assembly 34. The mounting pins 64 in their respective mounting holes 66 support the forward end of the outer liner 36, whereas the cooperating frame and liner tenons 68, 72 support the aft end of the outer liner 36 both in a simple-support type arrangement allowing free or unrestrained radial and axial growth of the outer liner 36.

As shown in FIG. 2, the liner tenons 72 extend radially outwardly around the circumference of the outer liner 36, with the frame tenons 68 of the outer frame 44 extending radially inwardly around the circumference of the outer frame 44. This arrangement increases the natural frequencies of the outer liner 36 as well as increases the buckling strength of the outer liner 36. Similarly, the liner tenons 72 may be disposed also at the aft end of the inner liner 38 and extend radially inwardly therefrom and are similarly uniformly spaced circumferentially around the inner liner 38. Correspondingly, the frame tenons 68 extend radially outwardly from the aft end of the inner frame 48 and similarly are uniformly circumferentially spaced therearound. This configuration similarly provides an aft support for the inner liner 38 preventing radial and tangential movement thereof while allowing unrestrained differential thermal radial expansion and contraction movement therebetween. Since the inner liner 38 is not subject to the buckling loads which exist across the outer liner 36, increased buckling capability of the inner liner 38 is not a significant factor. However, the additional simple support provided at the aft end of the inner liner 36 by the tenons 68, 72 increases the natural frequencies of the inner liner 38 and provides additional support which allows the inner liner 38 to be manufactured thinner than it otherwise would for reducing thermal gradients and stresses therethrough.

In the preferred embodiment both the outer and inner liners 36, 38 are non-metallic materials having thermal coefficients of expansion less than the thermal coefficient of expansion of the metallic outer and inner frames 44, 48, and are preferably ceramic matrix composite materials as described above.

In the exemplary embodiment of the combustor 18 illustrated in FIG. 2, the outer frame 44 includes a forward end integrally joined to and supporting in part the dome assembly 34; and the inner frame 48 similarly includes a forward end integrally joined and also supporting in other part the dome assembly 34. The aft end of the outer frame 44 is suitably joined to the outer casing 46, and the aft end of the inner frame 48 is also suitably joined to the inner casing 50. And, the aft ends of both the outer liner 36 and the inner liner 38 are joined to the respective outer and inner frames 44, 48 by the respective frame and liner tenons 68, 72 so that all the loads from the dome assembly 34 and the outer and inner liners 36, 38 are carried through the respective outer and inner frames 44, 48 to their respective casings 46, 50. Accordingly, as the outer and inner frames 44, 48 thermally expand during operation, the respective outer and inner liners 36, 38 are allowed to freely radially and axially grow relative to the outer and inner frames 44, 48 without undesirable restraint therefrom. The outer and inner liners 36, 38 are, therefore, securely mounted in the combustor 18 for withstanding the various pressure, thermal, and dynamic loads during operation while being free to expand and contract without restraint which would otherwise undesirably increase the stresses therein.

Referring again to FIG. 5, a conventional split-ring type L-shaped annular seal 76 may be used in cooperation with complementary slots adjacent to the tenons 68, 72 for controlling discharge of the spent impingement air 16 from between the liner 36 and frame 44. The seal 76 includes a plurality of circumferentially spaced apart metering holes 78 to control discharge of the spent air 16 past the tenons 68, 72.

Although the invention has been described with respect to an exemplary triple-dome combustor 18 as illustrated in FIG. 2, it may be used where appropriate in any type of combustor or exhaust system through which hot combustion gases are flowable.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A support assembly for a gas turbine engine combustor having an axial centerline axis comprising:
   a dome assembly;
   an annular frame having a plurality of circumferentially spaced apart, radially extending tenons;
   an annular combustor liner disposed coaxially with said frame and spaced radially therefrom, said liner including:
      a forward end having a plurality of circumferentially spaced apart mounting holes;
      an aft end having a plurality of circumferentially spaced apart, radially extending tenons circumferentially adjoining respective ones of said frame tenons for radially and tangentially mounting said liner aft end to said frame while allowing unrestrained differential thermal radial movement therebetween; and
   a plurality of radially extending mounting pins each joined at a proximal end to said dome assembly and each having a distal end slidably extending radially through a respective one of said mounting holes for mounting said liner forward end to said dome assembly while allowing unrestrained differential thermal radial movement therebetween.

2. An assembly according to claim 1 wherein at least one set of said frame tenons and said liner tenons are disposed in pairs, with each tenon pair being circumferentially spaced apart to define a slot therebetween slidably receiving therein a complementary tenon from the other of said frame and liner tenons for restraining circumferential movement of said liner in both clockwise and counterclockwise directions around said centerline axis while allowing radial movement of said complementary tenon in said slot.

3. An assembly according to claim 2 wherein said liner tenons are disposed in said pairs to define said slots in said liner, and said frame tenons are slidably disposed in respective ones of said liner slots.

4. An assembly according to claim 3 wherein said liner slots extend both radially and axially for allowing both radial and axial differential thermal movement of said liner tenons relative to said frame tenons.

5. An assembly according to claim 4 wherein:
   said liner is a radially outer liner and said combustor further includes a radially inner liner extending downstream from said dome assembly and spaced from said outer liner to define therebetween a combustion zone;
   said liner tenons extend radially outwardly around said outer liner; and
   said frame tenons extend radially inwardly around said frame and contact said liner tenons for restraining radial inward movement of said outer liner due to differential pressure loads thereacross for increasing buckling resistance of said outer liner.

6. An assembly according to claim 4 wherein:
   said liner is a radially inner liner and said combustor further includes a radially outer liner extending downstream from said dome assembly and spaced from said inner liner to define therebetween a combustion zone;
   said liner tenons extend radially inwardly around said inner liner; and
   said frame tenons extend radially outwardly around said frame.

7. An assembly according to claim 4 further including an annular casing disposed coaxially with said frame; and wherein said frame includes a forward end joined to and supporting said dome assembly, and an aft end having said frame tenons and joined to said casing for supporting both said liner and said dome assembly.

8. An assembly according to claim 4 wherein said liner is a non-metallic material having a thermal coefficient of expansion less than a thermal coefficient of expansion of said frame.

9. An assembly according to claim 8 wherein said liner is a ceramic matrix composite material.

* * * * *